March 19, 1946.　　　N. P. HOLCOMB　　　2,396,700
SPRING LOADING MACHINE
Filed Sept. 28, 1944　　　2 Sheets-Sheet 1

Inventor
Normand P. Holcomb
By C. E. Herrstrom & N. E. Thibodeau
Attorneys

March 19, 1946.   N. P. HOLCOMB   2,396,700
SPRING LOADING MACHINE
Filed Sept. 28, 1944   2 Sheets-Sheet 2

Inventor
Normand P. Holcomb

By C. E. Herrstrom & H. E. Thibodeau
Attorneys

Patented Mar. 19, 1946

2,396,700

UNITED STATES PATENT OFFICE 2,396,700

SPRING LOADING MACHINE

Normand P. Holcomb, Warehouse Point, Conn.

Application September 28, 1944, Serial No. 556,243

8 Claims. (Cl. 73—161)

(Granted under the act of March 3, 1883, as amended April 30, 1928; 370 O. G. 757)

The invention described herein may be manufactured and used by or for the Government for governmental purposes without the payment to me of any royalty thereon.

This invention relates to a spring testing device, more particularly to a device for compressing a spring to a predetermined height in order to ascertain the corresponding load.

Springs are designed to exhibit particular stress-strain ratios, and compression helical springs are usually tested by compressing to some particular height and determining the corresponding load pounds.

In the usual spring testing machine, the load is applied to the spring under test by means of a manually operated wheel which, by means of gears, causes a loading bar to act against the spring, compressing it, while the load pounds are indicated by other means, usually a needle moving across a dial. When the spring has been compressed to the desired height, the load pounds are read from the dial.

In operation, it has been found very difficult to compress a spring to an exact height and simultaneously read the load. The back pressure of stiff springs is frequently so great that it is practically impossible to hold the loading bar steady enough to get exact readings for the height and the corresponding load.

Accordingly it is an object of this invention to provide a spring compressing device including an accurate height indicating attachment, which device can be readily attached to a platform scale in order to compress the spring to a predetermined exact height and hold it there steadily while the load pounds are read.

Another object of this invention is to provide an accurate and easily read means of determining the height of the spring when under compression.

A further object of this invention is to provide means for the rapid adjustment of the loading device to an approximate setting, with a quick shift to means for making a fine adjustment and holding the loading device steady while taking readings, then changing back to the rapid adjustment for removing the load.

The specific nature of the invention as well as other objects and advantages thereof will clearly appear from a description of a preferred embodiment as shown in the accompanying drawings in which:

Fig. 4 is an enlarged sectional view to show the details of the pressure bar.

This invention consists essentially of a device adapted to be attached to the base of a conventional platform scale, having a stand under which a loading bar is adjusted by means of a system of gears and racks to the desired height. A worm and gear for fine adjustments are provided which can be thrown in or out of engagement, as desired, as by means of a cam and a dial gage operating from a rack to indicate the height of the spring.

Figure 1:
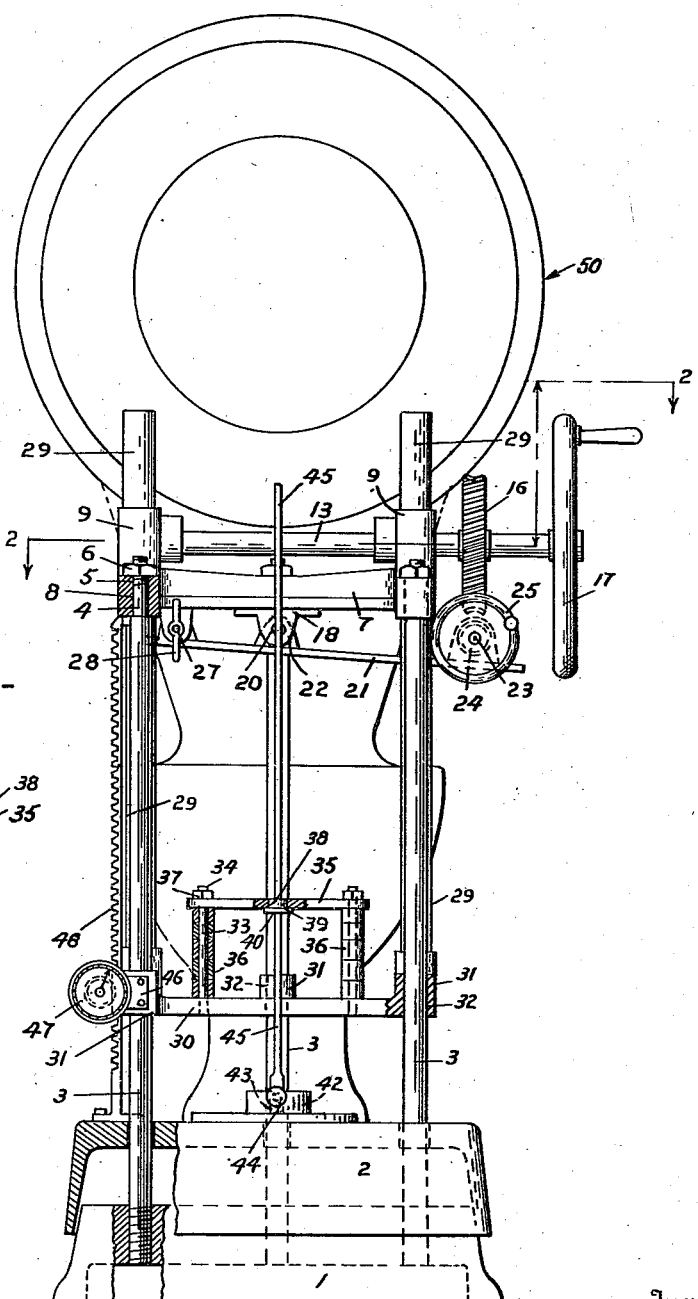
Fig. 1 is an elevational view in section showing the apparatus of the invention.
Figure 2:
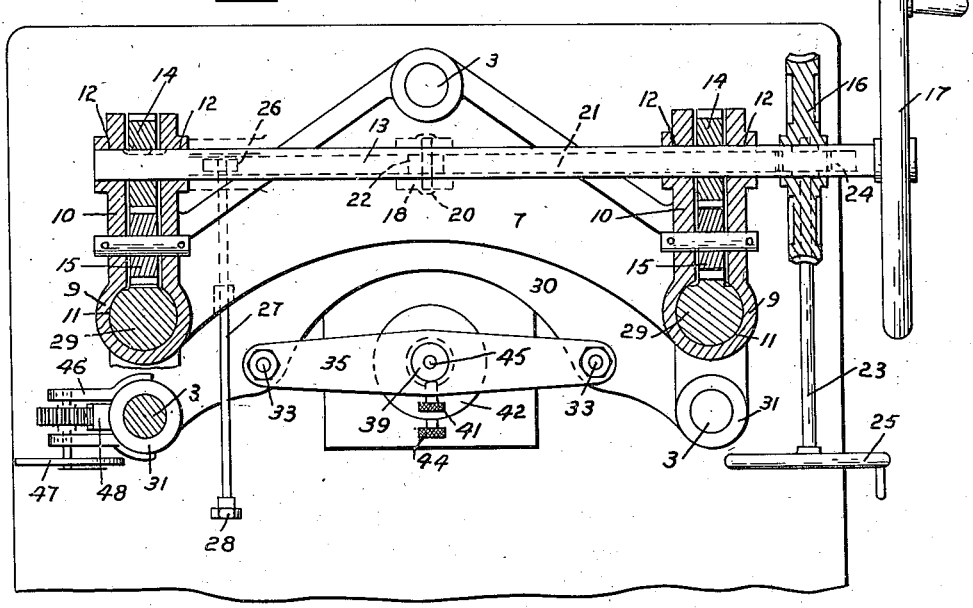
Fig. 2 is a sectional view on the line 2—2 of Fig. 1.
Figure 3:
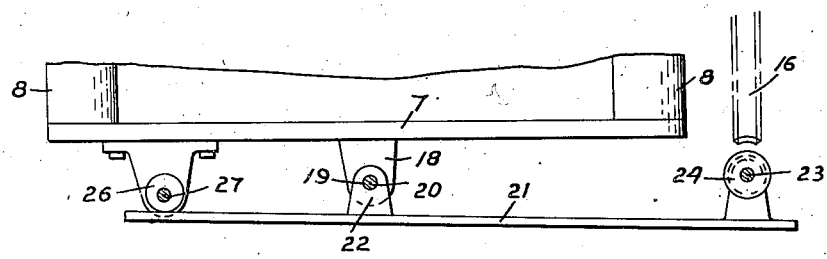
Fig. 3 is an elevational view of the upper portion of Fig. 1 in broken outline and to enlarged scale.

In a preferred embodiment illustrated in Fig. 1 the base of a conventional platform scale is shown as 1 and the loading platform as 2, with an indicating means at 50. Rigidly mounted on the base 1 are two or more upright bars 3, each provided with an upper reduced section 4, a threaded portion 5 and nut 6.

A yoke 7 is provided with three perforated mounting lugs 8 for engaging the reduced sections 4 of the upright bars 3 and is firmly held in assembled location on the sections 4 by the nuts 6. Each end of the yoke 7 is provided with a vertical boss 9 integral with a bifurcated lug 10 extending rearwardly.

The bosses 9 each have a vertical hole 11 for a purpose to be explained later and the bifurcated lugs 10 have axially coincident horizontal holes 12 for holding a shaft 13. This shaft is provided with two spur gears 14, each located within the bifurcated portion of one of the lugs 10. A pinion 15 is also provided within the bifurcation of each lug 10, and these engage the spur gears 14 on one side and extend into the vertical holes 11 on the other side. The right end of the shaft 13 extends beyond the end of the yoke 7 and is provided with a worm gear 16 and a hand wheel 17.

On the middle of the under side of the yoke 7 are provided two parallel lugs 18 with co-axial holes 19 arranged to receive a pin 20. A rocker arm 21 is provided, having a lug 22 on the top center thru which, in assembly, the pin 20 passes, holding the rocker arm between the parallel lugs 18, in a horizontal crosswise position. On one end of the rocker arm 21 and at right angles thereto, a shaft 23 is mounted by means of suitable bearings. Shaft 23 has a worm portion 24 which meshes with the worm gear 16, and on the end of shaft 23 is a hand wheel 25 for turning the same. The other end of the rocker arm 21 rests against a cam 26 on a shaft 27, which is suitably transversely supported in the left end of the rocker arm 21. On the front end of shaft 27 is a handle 28.

In the holes 11 in the bosses 9, are slidably located rack bars 29, which engage the pinions 15. At their lower end, the rack bars 29 are firmly attached to a yoke 30 which is also provided with bosses 31 thru which run vertical holes 32. In assembly, the upright bars 3 slidably fit in holes 32 and serve as guides for movement of yoke 30. The yoke 30 is also provided with vertical studs 33 each having a threaded portion 34 at its upper end. A pressure bar 35 is assembled over the studs 33 and held in desired relative vertical location by means of spacing sleeves 36 and nuts 37. The pressure bar 35 is provided with a hole 38, centrally located, in which is mounted a bushing 39 having a flange 40. Bushing 39 is held in place by a thumb screw 41. On the platform 2, in vertical alignment with the bushing 39, is an anvil 42 which has an axial hole 43 and a thumb screw 44 projecting into hole 43. A guide rod 45 of suitable diameter is held in the hole 43 in the anvil 42 by tightening thumb screw 44 and extends upward slidably thru the bushing 39.

A bracket 46 carrying an indicating dial 47 is mounted on the left boss 31 of the movable yoke 30. The dial 47 is operated from a rack 48, which is mounted on the platform 2, and indicates the height between the top of the anvil 42 and the under side of the bushing 39, so that the overall height of a spring under test, can be read at all times.

In operation a guide rod 45 of appropriate size and a bushing 39 to correspond, are selected, the bushing being fastened by means of the thumb screw 41 in the hole 38 in the pressure bar 35 with the flange 40 on the under side to take the thrust. After making sure that the worm 24 and worm gear 16 are disconnected, the yoke 30 carrying the pressure bar 35 is raised by rotation of the hand wheel 17 till the height between the top of the anvil 42 and the under side of bushing 39 is somewhat greater than the free height of the spring to be tested. The spring to be tested is then placed vertically on the anvil 42, the guide rod 45 is passed down thru the bushing 39 and the spring to be tested, to the anvil 42 and is fastened in the hole 43 by the thumb screw 44. The yoke 30 and the pressure bar 35 are then lowered by means of the hand wheel 17, to the approximate height at which the spring is to be tested, whereupon the handle 28 is turned 180 degrees, reversing the cam 26 and throwing the worm 24 into engagement with the worm gear 16. The final adjustment of height can now be made by means of the hand wheel 25 and the worm 24, which will also serve to hold the desired setting when it has been once attained, so that both the exact height and the corresponding exact load can be readily observed. After the test is completed, the handle 28 is turned 180 degrees, disengaging the worm 24 from the worm gear 16, whereupon the backing off of the pressure bar 35 and yoke 30 can be controlled by means of the hand wheel 17.

In order to accommodate springs of different inside diameters, various sizes of guide rods 45 should be provided, each of sufficient length and suitable diameter for the purpose intended and with one end of a size to fit freely into the hole 43 in the anvil 42 to be secured by means of the thumb screw 44.

When springs of excessive length are to be tested, the pressure bar 35 can be raised by assembling the spacing sleeves 36, or such proportion of them as is desirable, under the pressure bar 35 on the studs 33. In this manner the capacity of the machine to test springs of greater length is appreciably increased.

I claim:

1. A spring testing device of the class described comprising in combination, a platform scale device including a base provided with spaced uprights thereon and a loading platform movable relative to said base and said uprights, a rotatable shaft extending between said uprights, primary means for rotating said shaft at a certain rate, a yoke member slidable relative to said uprights, operative connections between said yoke member and said shaft whereby said yoke member may be moved relative to said platform, a pressure bar supported by said yoke member and adapted to compress a spring between it and said platform, means for indicating the distance between said bar and said platform, and secondary means whereby the shaft may be rotated independently of the primary means at a relatively slower rate.

2. A spring testing device of the class described comprising in combination, a platform scale device including a base provided with spaced uprights thereon and a loading platform movable relative to said base and said uprights, a rotatable shaft extending between said uprights, a yoke member slidable relative to said uprights, operative connections between said yoke member and said shaft whereby said yoke member may be moved relative to said platform, a pressure bar supported by said yoke member and adapted to compress a spring between it and said platform, said pressure bar being adjustable vertically relative to said yoke member, means for indicating the distance between said bar and said platform, primary means adapted to rotate said shaft at a certain rate, and secondary means adapted to rotate said shaft independently of the primary means at a relatively slower rate.

3. A spring testing device of the class described comprising in combination, a platform scale device having indicating means and including a base provided with spaced uprights thereon and a loading platform movable relative to said base, a rotatable shaft extending between said uprights, independent primary and secondary means arranged to respectively rotate said shaft at two different rates, a yoke member slidable relative to said uprights, operative connections between said yoke member and said rotatable shaft whereby the same may be elevated and lowered relative to said platform, a pressure bar movable with said yoke member, and means for indicating the distance between said bar and said platform.

4. A spring testing device of the class described comprising in combination, a platform scale device including a base provided with spaced uprights thereon and a loading platform movable relative to said base, a rotatable shaft extending between said uprights, independent primary and secondary means arranged to respectively rotate said shaft at two different rates, a yoke member slidable relative to said uprights, operative connections between said yoke member and said rotatable shaft whereby the same may be elevated or lowered relative to said platform, a pressure bar supported by said yoke member and adapted to compress a spring between the same and said platform, means for indicating the movement of said yoke member relative to said platform, and a guide member extending upwardly between said platform and said bar for centering a spring to be tested.

5. A spring testing device of the class described comprising in combination, a platform scale device including a base having fixed spaced uprights and a loading platform which is movable relative to both said base and said uprights, a horizontal shaft rotatably supported by said uprights, means for rotating said shaft, a yoke member fixed to said uprights, a rocker member pivotally supported by said yoke member and having one end portion adapted to be operatively connected to said shaft to rotate said shaft at a relatively slow rate and its other end portion provided with means whereby said rocker member may be rocked to move said one end portion thereof into and out of operative connection with said shaft, a pressure bar movable relative to said uprights, and means for indicating the distance between said platform and said bar.

6. A spring testing device of the class described comprising in combination, a platform scale device including a base having spaced uprights fixed thereto and a loading platform thereabove and movable relative to both said base and said uprights, a yoke member fixed on said uprights, a rotatable shaft supported by said uprights, a hand wheel for rotating said shaft, a second yoke member slidable on said uprights and operatively connected to said shaft so as to be elevated and lowered by rotation thereof, a rocker member pivotally supported by the first yoke member, said rocker member having a worm gear rotatably mounted in one end portion and adapted to be operatively connected to said shaft and its other end portion provided with means whereby said member may be rocked to move said worm gear into and out of operative connection with said shaft, a second hand wheel for rotating said worm gear, a pressure bar operatively connected to said second yoke member so as to be movable relative to said platform, and means for indicating the distance between said platform and said bar.

7. A spring testing device of the class described comprising in combination, a platform scale device including a base having spaced uprights fixed thereto and a loading platform movable relative to both the base member and the uprights, said platform being provided with an anvil thereon, a yoke member slidable relative to said uprights above said anvil, a horizontal shaft rotatably supported by said uprights above said yoke member, means for rotating said shaft, operative connections between said shaft and said yoke member whereby the latter may be elevated and lowered relative to said anvil, a pressure bar supported by said yoke member, means whereby said yoke member may be moved at a slower rate of said shaft, and means associated with said yoke member for indicating the distance between said anvil and said pressure bar.

8. A spring testing device of the class described comprising in combination, a platform scale device including a base having spaced uprights fixed thereto and a loading platform movable relative to both the base member and the uprights, a horizontal shaft rotatably supported by said uprights, means for rotating said shaft, a yoke member slidable relative to said uprights above said platform and below said shaft, operative connections between said shaft and said yoke member whereby the latter may be elevated and lowered relative to said platform, a pressure bar supported by said yoke member, means whereby said yoke member may be moved at a slower rate of said shaft and arranged to permit elevating and lowering of said yoke member independently of said shaft-rotating means, and means associated with said yoke member for indicating the distance between said platform and said bar.

NORMAND P. HOLCOMB.